Patented Mar. 25, 1924.

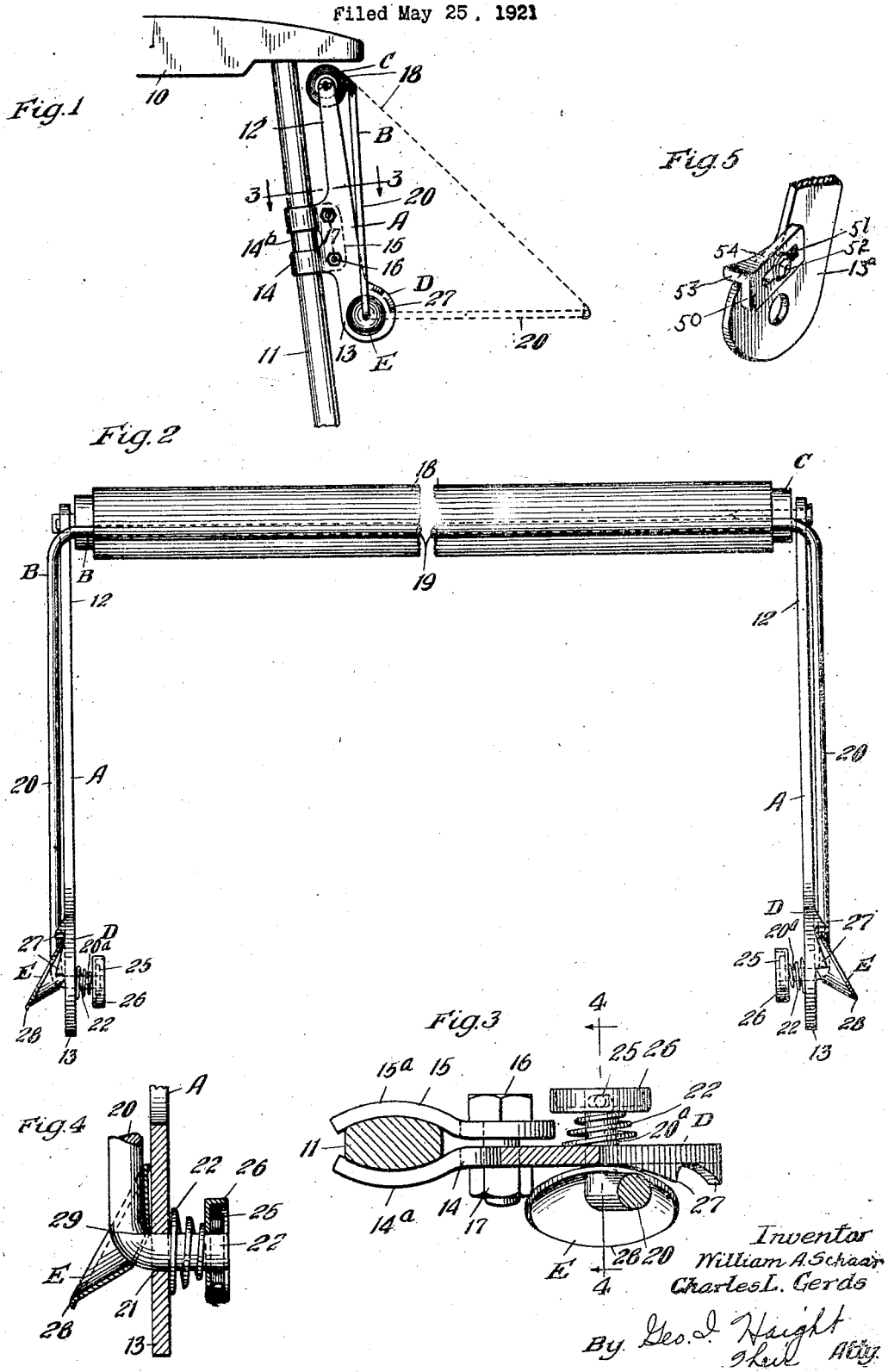

1,487,978

UNITED STATES PATENT OFFICE.

WILLIAM A. SCHAAR AND CHARLES L. GERDS, OF CHICAGO, ILLINOIS.

VISION SHIELD FOR VEHICLES.

Application filed May 25, 1921. Serial No. 472,484.

*To all whom it may concern:*

Be it known that we, WILLIAM A. SCHAAR and CHARLES L. GERDS, citizens of the United States, residing at Chicago, Cook County, Illinois, have invented certain new and useful Improvements in Vision Shields for Vehicles, of which the following is a full, clear, concise, and exact description, reference being had to the accompanying drawings, forming a part of this specification.

This invention relates to improvements in vision shields for vehicles.

One object of this invention is to provide a simple, efficient and comparatively inexpensive vision shield especially adapted for application to the wind shields of automobile trucks and other vehicles, the shield being so designed that it may assume an inoperative position in an inconspicuous place when not required but which at the same time is always readily adjustable, with a minimum of effort, to an operative position for the purpose of intercepting sun rays and also to prevent accumulation of rain, snow and the like on the wind shield during stormy weather, all to the end that the operation of the vehicle may be rendered easier and safer.

Another object of the invention is to provide a vision shield of the character above indicated so arranged that it will be automatically held in any one of several adjustable operative positions and which may be instantaneously released by mere pressure on certain parts of the shield proper, then automatically restored to its inoperative position.

Other objects of the invention will more clearly appear from the description and claims hereinafter.

In the drawing forming a part of this specification, Figure 1 is an elevational view of the front portion of the super-structure of an automobile showing my improvements applied to the wind shield thereof. The full lines indicate the position assumed by the parts when the shield is not in use and the dotted lines indicate the position assumed by the parts when the shield is in use. Figure 2 is a broken front elevational view, upon a larger scale, of the arrangement shown in Figure 1. Figure 3 is an enlarged detail sectional view corresponding substantially to the line 3—3 of Figure 1, Figure 4 is a sectional view corresponding to the section line 4—4 of Figure 3 and Figure 5 illustrates a modification.

In said drawings, the automobile is shown as provided with a top 10 and a wind shield provided with side posts 11—11.

In carrying out our invention, the vision shield is applied as near the top of the wind shield as possible so as to enable it to perform its functions without at the same time interfering with the vision of the operator along the roadway in front of the vehicle. The vision shield, as shown, comprises broadly, two side arms or plates or brackets A—A; a U-shaped rod B; a self-winding roller shade C; arcuate racks D—D on the members A; release washers E—E, together with certain other details of construction hereinafter described.

The brackets or arms A are of like construction except that one is made right handed and the other left handed. Each consists preferably of a piece of sheet metal cut to the desired form and made of the requisite stiffness. Each of said brackets or arms A is formed with an upwardly extending section 12, a downwardly extending section 13 and a laterally extending section 14, the latter being suitably bent as indicated at 14ᵃ to fit against the outer side of the post 11, as shown best in Fig. 3. Said lateral extension 14 is comparatively wide, that is, lengthwise of the post 11, so as to provide for a secure attachment to the post and may be suitably cut away or notched as indicated at 14ᵇ in Figure 1, to reduce the weight. A clamp plate 15 cooperates with each clamping section 14, each plate 15 being suitably bent as indicated at 15ᵃ to fit against the inner side of the post 11 as shown in Figure 3. The plate 15 is attached to the section 14 adjustably by any suitable means such as the bolts 16 and nuts 17. With this arrangement, it is evident that the shield may be readily attached and detached from the vehicle and clamped in any desired position along the posts of the wind shield framework. In case the shield is used on a closed car, the brackets would be suitably formed so as to be readily attached by screws to the corner posts.

The self-winding roller shade C may be of any desired form, the details of which it is not deemed necessary to illustrate or describe. The same is rotatably secured to the upper ends of the sections 12 of the brackets A as best shown in Figure 1. Said roller shade, in addition to the usual roller proper, includes a shade or curtain proper, indicated at 18 which may be wound upon or unwound from the roller proper in the usual manner. In carrying out the invention, the usual catches or dogs employed on household roller shades are omitted so as to prevent difficulty in the winding up of the shade proper.

The rod B is preferably of circular cross-section and has an upper horizontally extending cross piece 19 and parallel integral side arms 20—20. Each of the side arms 20 is formed with a right angled inwardly extending pivot-forming section 20ᵃ extended through a suitable opening or bearing 21 in member A as best shown in Fig. 4. On the inner side of each member A, there is applied to the corresponding pivot forming section 20ᵃ, a conical coil spring 22. A cotter pin 25 is passed through a suitable corresponding perforation in the extension 20ᵃ as shown in Fig. 4 and a light sheet metal washer 26 is interposed between the cotter and the corresponding spring 22 so as to hold the parts in assembled relation.

The arcuate racks D, heretofore referred to are preferably formed integrally with the members A on the outer sides thereof and concentric with the pivotal axis of the rod B. Each of said racks D includes a plurality of shouldered teeth 27 uniformly arranged on the two racks and with their shoulders so extending that when the arms 20 of the rod B engage therewith, the rod B cannot be pulled upwardly. The teeth are also so formed that the arms 20 of the rod B may readily be slipped downwardly past the teeth 27 successively, it being understood that there is a certain amount of inherent resiliency in the rod B to permit of this, and also that the springs 22 will yield for the same purpose.

Loosely applied to each arm 20 at the angle, between the arm 20 proper and the extension 20ᵃ thereof and on the outer side of the corresponding member A is the release washer E. The latter is preferably of sheet metal and of conical form with a slightly curled edge as best shown in Fig. 4. The arrangement is such that, the lower portion of each washer E as indicated at 28 in Fig. 4 will always be spaced outwardly from the corresponding member A thereby adapting it, when pressed at the point indicated at 28 to fulcrum about the edge indicated at 29 in Fig. 4.

The improved shield is used as follows:

Assuming that the driver or operator desires to bring the wind shield into use, he merely pushes on the side arms 20 so as to swing the latter downwardly to a position as indicated for instance by the dotted lines in Fig. 1. The driver may readily do this on any ordinary automobile since the wind shield structures are narrow enough to permit a man extending his arms simultaneously around both sides thereof. As the arms 20 of the rod B are swung downwardly as described, they automatically slip over the teeth 27 until the desired position is reached and thereafter the arms 20 will be held by the proper set of teeth 27. To release the shield, and restore the parts to their inoperative position, the driver merely extends his hands to each side of the wind shield structure and presses downwardly against the lower points 28 of the release washers 22. This action forces the arms 20 outwardly away from engagement with the racks D and against the action of the springs 22. Due to the self-winding action of the roller shade, the shade proper will be automatically wound up upon the roller proper and thereby pull the rod B to the full line position shown in Figure 1.

From the foregoing description of the manner of using the invention, it will be seen that the efforts required of the driver are reduced to a minimum, both in placing the shield in operative position and in releasing it. This is of extreme importance since the amount of time required of the driver is reduced to a minimum and his attention to the driving and steering of the vehicle never distracted for more than an instant, and thus permitting the driver to continue the vehicle in motion. Another important feature of the invention resides in the fact that the entire shield may be assembled, shipped and applied as a unit, all of the parts maintaining their assembled relation even when detached from the vehicle.

Referring to the modification shown in Fig. 5, we have therein illustrated an adjustable arrangement by which the curtain may be held at any desired position. The arrangement comprises an angular plate 50 adjustably secured to the arm 13ᵃ by means of the slot 51 and bolt 52. Said plate 50 is provided at its outer end with a laterally projecting shoulder 53 over which the corresponding rod or arm 20 is adapted to catch as in the case of the shoulders 27. A cam surface 54 is formed on the plate 50 to facilitate the positioning of the rod 20 in bringing the curtain into use. As will be understood, the arrangement shown in Fig. 5 will be duplicated on both sides of the vision shield.

The arrangement herein shown and described, illustrates the preferred manner of carrying out the invention, but the same is by way of illustration only and not by way of limitation. All changes and modifications are contemplated that come within the scope of the claims appended hereto.

What is claimed is:

1. In a vision shield adapted for use on the front of a superstructure, including upright side members, of an automobile or other vehicle, the combination with a pair of arms, each having between the ends thereof a clamping means adapted to rigidly secure the said arms to said side members; of movable side arms having lateral extensions slidably and pivotally mounted on said first named arms to swing in substantially vertical planes and move laterally relatively to said first named arms; an extensible shade attached to one end of said first named arms and at its opposite end to said pivotal arms; co-operable automatically operating means on said first named arms and the second named arms arranged to hold the latter in adjusted position with the shade extended; and manually operable means for moving said first named arms laterally relative to each other thereby rendering said first named means inoperative.

2. In a vision shield adapted for use on the front of a superstructure, including upright side members, of an automobile or other vehicle, the combination with a pair of arms adapted to be rigidly secured to said side members; of movable side arms pivotally attached to said first named arms and arranged to swing in substantially vertical planes and to move laterally relative to said first named arms at their pivotal connection; a self-winding roller shade including a shade proper, the roller being rotatably mounted on the ends of one of said sets of arms and the free edge of the shade proper being attached to the other set of arms; co-operable automatically operating means on said first named pair of arms and said second named pair of arms arranged to hold the latter in adjusted position with the roller shade extended; and manually operable means for moving said second named arms laterally, thereby rendering said first named means temporarily inoperative, said first named means including a resilient element operatively interposed between each of said pivoted arms and the respective rigidly mounted arm.

3. In a vision shield adapted for use on the front of a superstructure, including upright side members, of an automobile or other vehicle, the combination with a pair of arms adapted to be rigidly secured to said side members; of movable side arms pivotally attached to said first named arms and arranged to swing in substantially vertical planes and the pivoted ends of said second named arms being movable laterally relative to the first named arms; an extensible shade attached at one end to said first named arms and at its opposite end to the second named arms; rack on said first named arms adjacent the pivotal connections between the two sets of arms and with the teeth of which the movable arms are adapted to directly engage; spring means operatively interposed between the movable arms and the stationary arms and effective to automatically engage the movable arms with said racks to thereby automatically hold said movable arms in operative position.

4. In a vision shield of the character described, the combination with a pair of brackets adapted to be secured to the wind shield structure of an automobile or the like; of a U-shaped member comprising a horizontally extending cross section and parallel side arms, the latter being pivotally connected at their free ends to the lower portions of said brackets; a self-winding roller shade operatively attached to said brackets and said U-shaped member; racks on said brackets adjacent the pivotal connections between said brackets and arms and with which said arms are adapted to engage; resilient means normally compelling said arms into operative relation with said racks when the roller shade is unwound; and manually operable cam elements adapted to disengage said arms from said racks against the action of said resilient means, each said cam element consisting of a conical washer mounted on the pivotal section of one of said arms, said washer being interposed between said arm and the corresponding adjacent bracket.

In witness that we claim the foregoing, we have hereunto subscribed our names this 11th day of May, 1921.

WILLIAM A. SCHAAR.
CHARLES L. GERDS.

Witnesses:
CARRIE GAILING,
ANN BAKER.